(12) United States Patent
Lee et al.

(10) Patent No.: US 8,415,035 B2
(45) Date of Patent: Apr. 9, 2013

(54) PERPENDICULAR MAGNETIC RECORDING MEDIUM

(75) Inventors: Hoo San Lee, Osan-si (KR); Hoon Sang Oh, Seongnam-si (KR); Sok Hyun Kong, Seoul (KR); Seong Yong Yoon, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 1516 days.

(21) Appl. No.: 11/643,775

(22) Filed: Dec. 22, 2006

(65) Prior Publication Data

US 2007/0298286 A1     Dec. 27, 2007

(30) Foreign Application Priority Data

Jun. 22, 2006  (KR) .................. 10-2006-0056447

(51) Int. Cl.
*G11B 5/66* (2006.01)
(52) U.S. Cl. ...................................... 428/827
(58) Field of Classification Search ........ 428/800–848.9
See application file for complete search history.

(56) References Cited

U.S. PATENT DOCUMENTS

2004/0058197 A1* 3/2004 Nakamura et al. ..... 428/694 MM
2005/0008902 A1* 1/2005 Bertero et al. ......... 428/694 TM

FOREIGN PATENT DOCUMENTS

JP        2004-079104 A     3/2004
JP        2004227666 A      8/2004

OTHER PUBLICATIONS

Maching Translation of JP 2004-079104 (2004).*
Machine Translation of JP 2002-063718 (2002).*

* cited by examiner

*Primary Examiner* — Holly Rickman
*Assistant Examiner* — Linda Chau
(74) *Attorney, Agent, or Firm* — Hall Estill Attorneys at Law

(57) ABSTRACT

A perpendicular magnetic recording medium is provided. The perpendicular magnetic recording medium includes: a perpendicular magnetic recording layer formed on a substrate; and at least one soft magnetic under-layer formed between the substrate and the perpendicular magnetic recording layer, wherein the soft magnetic under-layer is made from an alloy of a non-magnetic material and a magnetic material which exists in the form of granular nanoparticles in matrix of the non-magnetic material, and at least two of the magnetic nanoparticles are spaced apart from one another by a predetermined distance so as to mutually make an anti-ferromagnetic coupling.

6 Claims, 3 Drawing Sheets

PERPENDICULAR MAGNETIC RECORDING MEDIUM

CROSS-REFERENCE TO RELATED PATENT APPLICATIONS

This application claims priority from Korean Patent Application No. 10-2006-0056447, filed on Jun. 22, 2006, in the Korean Intellectual Property Office, the disclosure of which is incorporated herein in its entirety by reference.

BACKGROUND OF THE INVENTION

1. Field of the Invention

Apparatuses consistent with the present invention relate to a perpendicular magnetic recording medium, and more particularly to a perpendicular magnetic recording medium, which can restrain formation of multi granule domains, thereby minimizing noise of a soft magnetic under-layer.

2. Description of the Prior Art

Generally, perpendicular magnetic recording mechanisms have a higher recording density than that of longitudinal magnetic recording mechanisms. Therefore, the latest hard disc drive employs a perpendicular magnetic recording mechanism for the high recording density.

In the perpendicular magnetic recording mechanism, magnetization is accomplished perpendicular to a plan surface of a medium. Such a perpendicular magnetic recording mechanism includes a perpendicular magnetic recording medium having a double magnetic layer with a ferro-magnetic layer and a soft magnetic under-layer, and a pole head.

Hereinafter, the configuration of the related art perpendicular recording medium will be described with reference to FIG. 1.

FIG. 1 is a view showing a configuration of a laminated perpendicular magnetic recording medium according to a related art. As shown in FIG. 1, the related art perpendicular magnetic recording medium respectively includes a substrate 1, a soft magnetic under-layer 3, an intermediate layer 5, a perpendicular magnetic recording layer 7, and a protection layer 9, which are in turn laminated.

The substrate 1 is mainly made of glass or AlMg, an alloy of Aluminum (Al) and Magnesium (Mg), and the soft magnetic under-layer 3 made of CoZrNb, an alloy of Cobalt (Co), Zirconium (Zr), and Niobium (Nb), CoFeB, an alloy of Co, Iron (Fe) and Boron (B), or NiFe, an alloy of Nickel (Ni) and Fe. The intermediate layer 5 is substantially formed from Tantalum (Ta)/Ruthenium (Ru), the perpendicular magnetic recording layer 7 made of CoCrPt—$SiO_2$ and the like, and the protection layer 9 made of Diamond Like Carbon (DLC).

In order to increase a field strength and a field gradient during recording of data on the perpendicular magnetic recording medium, the soft magnetic under-layer 3 must be prepared under the perpendicular magnetic recording layer 7 in character of the magnetic circuit of a pole head. However, the soft magnetic under-layer 3 generates a magnetic flux as noise caused by a domain wall. Accordingly, there is a problem in that the soft magnetic under-layer 3 acts as a noise source when data is reproduced.

As shown in FIG. 1, if the perpendicular magnetic recording medium has a simple configuration, it is impossible to prevent the soft magnetic under-layer 3 from making multi-domains. The multi-domains of the soft magnetic under-layer 3 act as a factor of remarkably decreasing a Signal to Noise Ratio (SNR) when data is reproduced. In the case of the perpendicular magnetic recording medium with a high density, reduction of a SNR caused by the multi-domains of the soft magnetic under-layer is very serious.

Thus, many methods have been researched in order to solve the problem of generation of noise due to the multi-domains. Specifically, there has been proposed a perpendicular magnetic recording medium having a structure in which the soft magnetic under-layers with a single domain are interposed between the substrate and the perpendicular magnetic recording layer.

Where a plurality of soft magnetic under-layers is interposed between the substrate and the perpendicular magnetic recording layer, it is possible to restrain noise caused by the multi-domains. However, there are problems in that processes are complicated, productivity is lowered, and manufacturing costs increase.

Meanwhile, a magnetic domain with a size of nanometer scale has been proposed to reduce noise of a soft magnetic under-layer. Japanese Laid-open Patent Publication No. 2004-079104 discloses a high dense magnetic recording medium including a non-magnetic substrate 11, a soft magnetic material layer 13 formed on the non-magnetic substrate 11 and having nanoparticles 13', an intermediate layer 15 formed on the soft magnetic material layer 13, and a hard magnetic material layer 17, as shown in FIG. 2.

In the high dense magnetic recording medium according to the Japanese Laid-open Patent Publication 2004-079104, it is possible to control the generation of noise due to the irregular diameter of particles by controlling uniformly the mean diameter of the nanoparticles which are dispersed in the soft magnetic material layer. However, the nanoparticles still interact with one another. Further, the nanoparticles, which are magnetized in the same direction, are located adjacent to one another so as to form multi granule domains. Therefore, it is difficult to restrain the generation of noise due to the form of the multi granule domains in the soft magnetic material layer.

SUMMARY OF THE INVENTION

The present invention provides a perpendicular magnetic recording medium, which can allow magnetic materials constructing a soft magnetic under-layer to exist in the form of granules in a non-magnetic matrix, and the granules of the magnetic materials to make an anti-ferromagnetic coupling with one another, thereby restraining the formation of multi granule domains.

According to an aspect of the present invention, there is provided a perpendicular magnetic recording medium, which includes: a perpendicular magnetic recording layer formed on a substrate; and at least one soft magnetic under-layer formed between the substrate and the perpendicular magnetic recording layer, wherein the soft magnetic under-layer comprises an alloy of a non-magnetic material and a magnetic material which exists in the form of granular nanoparticles in matrix of the non-magnetic material, and at least two of the magnetic nanoparticles are spaced apart from one another by a predetermined distance so as to mutually make an anti-ferromagnetic coupling.

Preferably, but not necessarily, the predetermined distance between the at least two nanoparticles is about 0.5 nm-2 nm. Further, a composition of the magnetic material is about 20 at %-60 at % of the soft magnetic under-layer.

Preferably, but not necessarily, a diameter of the nanoparticles is about 5 nm-10 nm.

Preferably, but not necessarily, the magnetic material is selected from Cobalt (Co), Iron (Fe), an alloy of Cobalt and Platinum (CoPt), an alloy of Cobalt and Chrome (CoCr), and an alloy of Nickel, Iron and Cobalt (NiFeCo), and the non-magnetic material is selected from Copper (Cu), Aluminum (Al), Titanium (Ti), Ruthenium (Ru), and Tantalum (Ta).

Further, the soft magnetic under-layer is formed by vapor-depositing an alloy of the magnetic material and the non-magnetic material on the substrate by a Physical Vapor Deposition. Preferably, but not necessarily, the soft magnetic under-layer is annealed at a temperature of about 150° C.-600° C. during or after the vapor deposition.

In the perpendicular magnetic recording medium, since the magnetic material forming the soft magnetic under-layer exists in the form of granules in a non-magnetic matrix and granular particles mutually make an anti-ferromagnetic coupling, it is possible to restrain the formation of multi granular domains, resulting in minimizing noise of the soft magnetic under-layer.

BRIEF DESCRIPTION OF THE DRAWINGS

The above and other aspects of the present invention will be more apparent from the following detailed description taken in conjunction with the accompanying drawings, in which.

DETAILED DESCRIPTION OF EXEMPLARY EMBODIMENTS

Hereinafter, an exemplary embodiment of the present invention will be described in detail with reference to the accompanying drawings.

Figure 1:
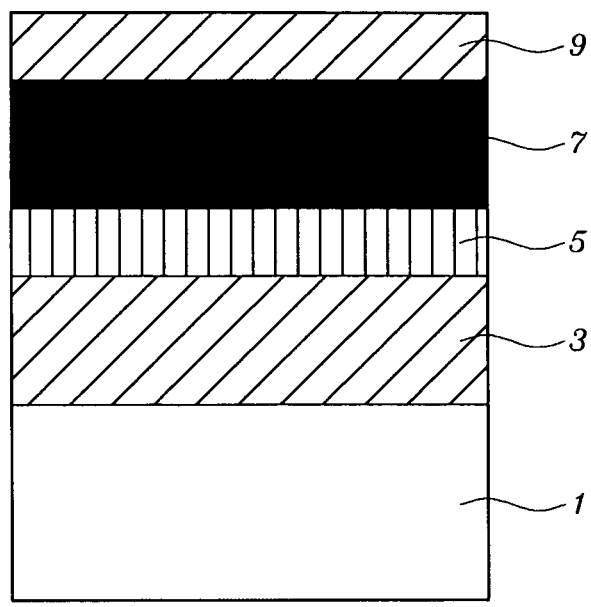
FIG. 1 is a view showing a configuration of a laminated perpendicular magnetic recording medium according to a related art.
Figure 2:
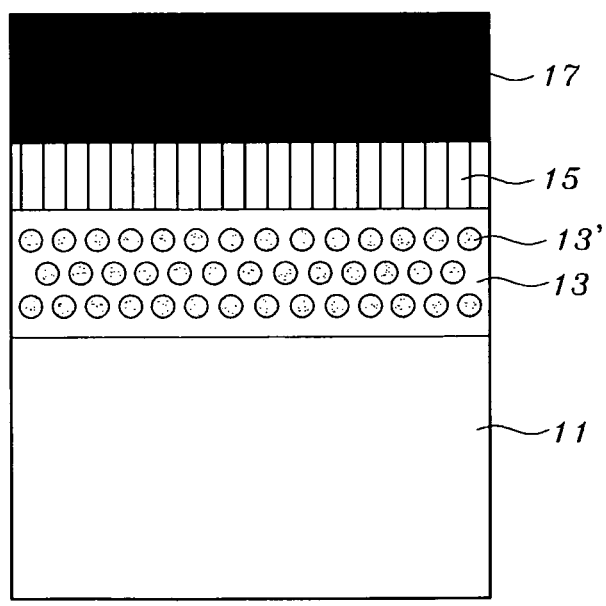
FIG. 2 is a view showing the configuration of the laminated perpendicular magnetic recording medium according to the related art, in which nanoparticles are dispersed a soft magnetic under-layer.
Figure 3:
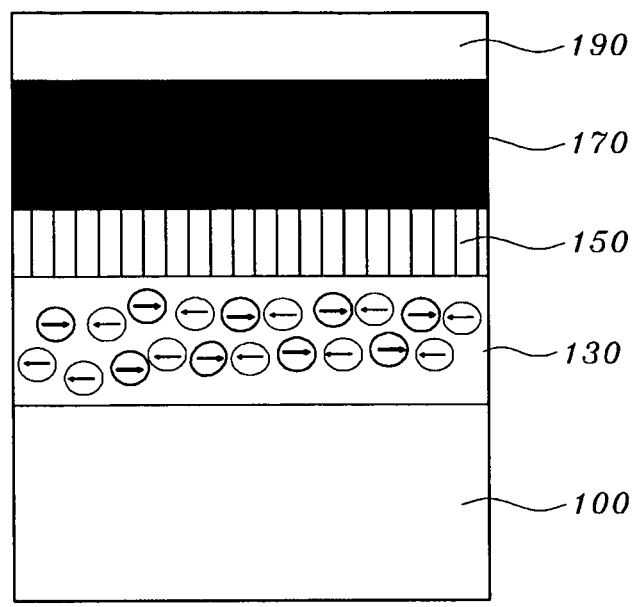
FIG. 3 is a view showing a configuration of a laminated perpendicular magnetic recording medium according to an exemplary embodiment of the present invention.

FIG. 3 is a view showing a configuration of a laminated perpendicular magnetic recording medium according to an exemplary embodiment of the present invention.

As shown in FIG. 3, the perpendicular recording medium according to an exemplary embodiment the present invention include a substrate 100, a soft magnetic under-layer 130 formed on an upper surface of the substrate 100, an intermediate layer 150 formed on an upper surface of the soft magnetic under-layer 130 to improve crystallinity of a perpendicular magnetic recording layer 170, the perpendicular magnetic recording layer 170 formed on an upper surface of the intermediate 150, on which information is recorded, and a protection layer 190 formed on an upper surface of the perpendicular magnetic recording layer 170.

The gist of the present invention relates to the soft magnetic under-layer 130. Hereinafter, the soft magnetic under-layer will be described in detail with reference to FIG. 4.

Figure 4:
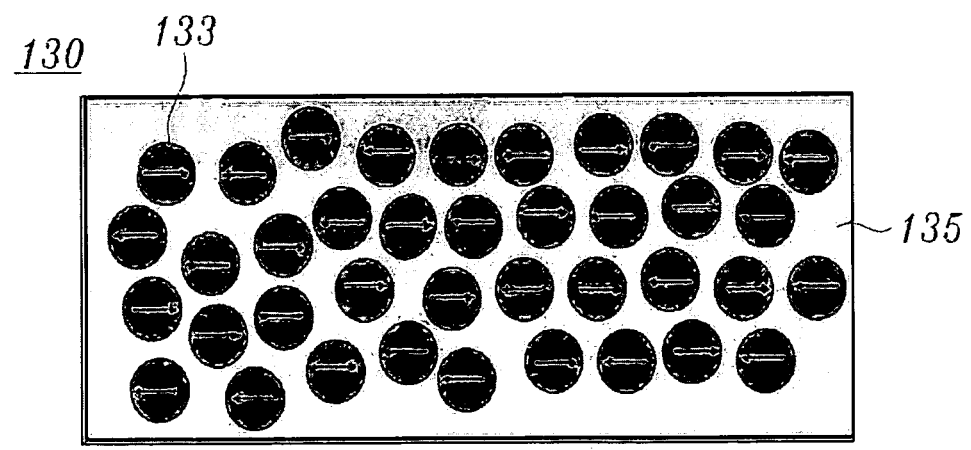
FIG. 4 is a schematic view showing the configuration of a soft magnetic under-layer of the perpendicular magnetic recording medium according to an exemplary embodiment of the present invention.

FIG. 4 is a schematic view showing the configuration of a soft magnetic under-layer of the perpendicular magnetic recording medium according to an exemplary embodiment of the present invention.

As shown in FIG. 4, the soft magnetic under-layer 130 of the perpendicular recording medium according to an exemplary the present invention is made of an alloy of a magnetic material 133 and a non-magnetic material 135. The magnetic material 133 is dispersed in the form of granular type nanoparticles in the non-magnetic material 135. The alloy made from the non-magnetic material 135 and the granular type magnetic material 133 is sputtered on the substrate, so as to form the soft magnetic under-layer 130.

At this time, the magnetic material 133 is selected from Cobalt (Co), Iron (Fe), an alloy of Co and Platinum (Pt), an alloy of Co and Chrome (Cr), and an alloy of Nickel (Ni), Fe and Co. The non-magnetic material 135 is selected from Copper (Cu), Aluminum (Al), Titanium (Ti), Ruthenium (Ru), and Tantalum (Ta).

On the other hand, the magnetic nanoparticles 133 should be dispersed in the non-magnetic material 135 to make anti-ferromagnetic coupling (hereinafter, referred to as AFC) to one another. If the nanoparticles 133 make the AFC, they are magnetized in opposite directions so as to act as a magnetic domain. Thus, it is possible to prevent multi granule domains from being formed.

Here, the magnetic nanoparticles 133 have an exchange coupling force therebetween, the direction of which becomes different according to distance between the nanoparticles 133. Hence, it is necessary to control the distance between the nanoparticles 133 so that the adjacent nanoparticles 133 make the AFC.

Where the nanoparticles 133 are spaced apart from one another by a distance of "a", a force acts between the nanoparticles 133 to enable the nanoparticles 133 to be parallel-magnetized with one another. If the nanoparticles 133 are spaced apart from one another by a distance of "b", a force acts between the nanoparticles 133 to allow the nanoparticles to be anti-parallel-magnetized. Therefore, when the nanoparticles 133 are made to be spaced apart from one another by the distance of "b", the adjacent nanoparticles 133 make the AFC to one another.

If the distance between the nanoparticles 133 is short, the adjacent nanoparticles 133 make a ferromagnetic coupling to one another. This causes the soft magnetic under-layer 130 to have an identical structure with a continuous layer, thereby hardly preventing the multi granule domains from being formed.

To the contrary, if the distance between the nanoparticles 133 is too long, the coupling between the nanoparticles 133 almost disappears, so that the nanoparticles 133 respectively act. Further, since the ratio of the magnetic material 133 to the non magnetic material 135 is too small in the soft magnetic under-layer, the soft magnetic under-layer fails to carry out its most functions.

Therefore, it is important to suitably control the distance between the nanoparticles 133 so that the nanoparticles 133 mutually make the AFC. The distance between the nanoparticles 133 to make the AFC may be different according to the kind of the magnetic material 133 and the non-magnetic material 135. Generally, when the nanoparticles 133 are spaced apart from one another by a distance of 0.5 nm-2 nm, the nanoparticles 133 can mutually make the AFC.

The distance between the nanoparticles 133 can be defined by controlling the concentration of the magnetic material 133. If the concentration of the magnetic materials 133 increases, the distance between the nanoparticles 133 becomes short. If the concentration of the magnetic materials 133 decreases, the distance between the nanoparticles 133 becomes long.

Thus, only when the concentration of the magnetic materials 133 must be suitably controlled, the nanoparticles 133 can mutually make the AFC.

For example, in the case where the magnetic material 133 of the soft magnetic under-layer is Co and the non-magnetic material 135 is Cu, if the density of Co is about 20 at %-60 at %, Co nanoparticles 133 can mutually make the AFC.

At this time, preferably, but not necessarily, the nanoparticles 133 with a diameter of 5 nm-10 nm are used because the diameter of the nanoparticles 133 has close connection with the generation of noise.

Meanwhile, the soft magnetic under-layer 130 may be formed by vapor-depositing, for example by using a Physical Vapor Deposition method, an alloy of the magnetic material and the non-magnetic material on the substrate, and may selectively be annealed during or after the vapor deposition. The annealing is preferably, but not necessarily, carried out at the temperature of 150° C.-300° C.

The perpendicular magnetic recording medium may be manufactured using a single soft magnetic under-layer 130 made as described above. In addition, the perpendicular magnetic recording medium may be manufactured by laminating multiple soft magnetic under-layers 130.

Figure 5:
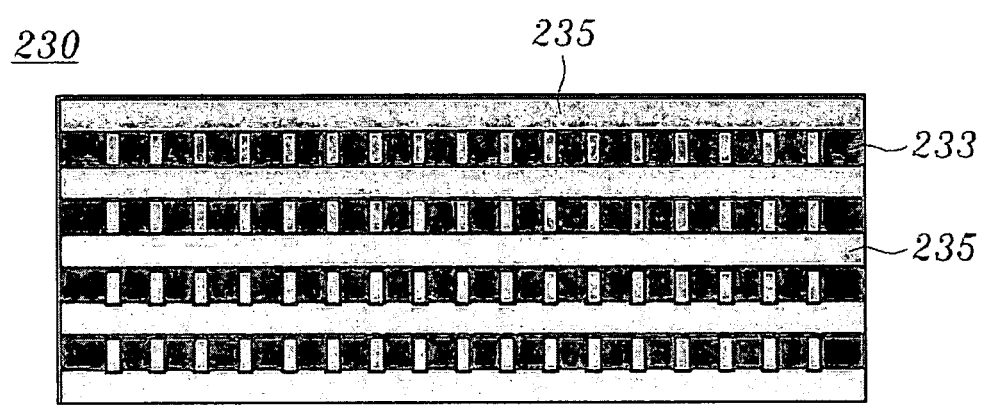
FIG. 5 is a schematic view showing the configuration of multiple soft magnetic under-layers of the perpendicular magnetic recording medium according to an exemplary embodiment of the present invention.

In the case of forming multiple soft magnetic under-layers 230, non-magnetic materials 235 and magnetic materials 233 are alternately laminated and then treated by heat. As a result, it is possible to obtain the soft magnetic under-layers 230 shown in FIG. 5. Preferably, but not necessarily, the multiple soft magnetic under-layers are annealed at a temperature of about 250° C.-600° C. which is higher than that when the single soft magnetic under-layer is formed.

When the soft magnetic under-layers are formed as described above, the size of the granule nanoparticles and the distance between the nanoparticles can be more uniform.

The exemplary embodiments of the present invention have been disclosed in the detailed description and drawings. Specific terms are used to describe the exemplary embodiments of the present invention, but do not limit the scope of the present invention as disclosed in the accompanying claims.

In the perpendicular magnetic recording medium according to the exemplary embodiments of the present invention, the magnetic material constructing the soft magnetic under-layer exists in the form of granules in the non-magnetic material matrix. The granule nanoparticles mutually make anti-ferromagnetic coupling, thereby restraining the formation of multi granule domains, resulting in minimizing noise of the soft magnetic under-layer.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A perpendicular magnetic recording medium comprising:
    a perpendicular magnetic recording layer formed on a substrate; and
    a single soft magnetic under-layer formed between the substrate and the perpendicular magnetic recording layer,
    wherein the soft magnetic under-layer comprises an alloy of a non-magnetic material and a magnetic material which exists in the form of granular nanoparticles in the non-magnetic material, and at least two of the magnetic nanoparticles are spaced apart from one another by a predetermined distance so as to mutually make an anti-ferromagnetic coupling within the soft magnetic under-layer in a direction substantially parallel to a surface thereof facing the substrate.

2. The perpendicular magnetic recording medium as claimed in claim 1, wherein the predetermined distance between the at least two nanoparticles is about 0.5 nm-2 nm.

3. The perpendicular magnetic recording medium as claimed in claim 1, wherein a composition of the magnetic material is about 20 at %-60 at % of the soft magnetic under-layer.

4. The perpendicular magnetic recording medium as claimed in claim 1, wherein a diameter of the nanoparticles is about 5 nm-10 nm.

5. The perpendicular magnetic recording medium as claimed in claim 1, wherein the magnetic material is selected from Cobalt (Co), Iron (Fe), an alloy of Cobalt and Platinum (CoPt), an alloy of Cobalt and Chrome (CoCr), and an alloy of Nickel, Iron and Cobalt (NiFeCo).

6. The perpendicular magnetic recording medium as claimed in claim 1, wherein the non-magnetic material is selected from Copper (Cu), Aluminum (Al), Titanium (Ti), Ruthenium (Ru), and Tantalum (Ta).

* * * * *